P. COOMBES.
Apparatus for Separating Whey from Curd.
No. 52,939. Patented Feb. 27, 1866.
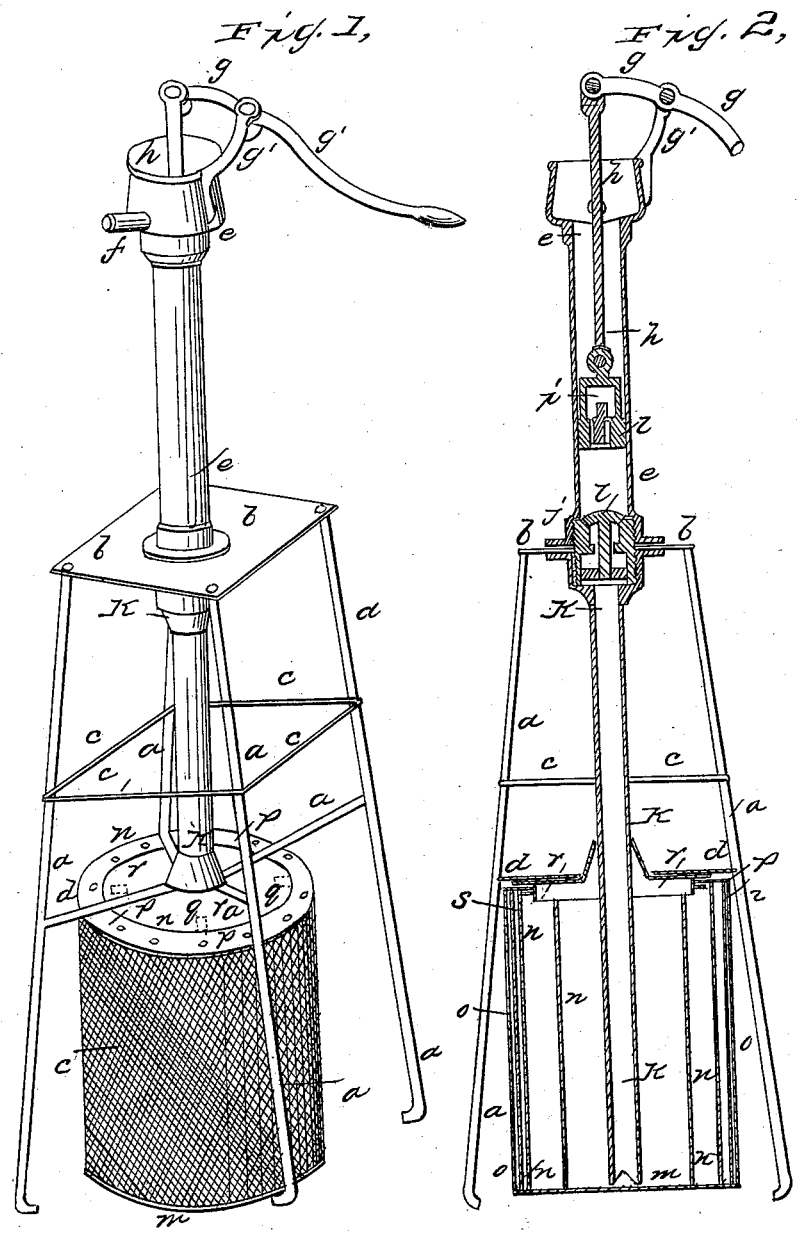
WITNESSES:
John J. King
John Davis
INVENTOR
Philip Coombes

UNITED STATES PATENT OFFICE.

PHILIP COOMBES, OF LIVERPOOL, ENGLAND.

IMPROVEMENT IN APPARATUS FOR SEPARATING WHEY FROM CURD.

Specification forming part of Letters Patent No. 52,939, dated February 27, 1866.

*To all whom it may concern:*

Be it known that I, PHILIP COOMBES, of Liverpool, in the county of Lancaster, in that part of Her Britanic Majesty's dominions called England, plumber, have invented new and useful Mechanical Means or Apparatus for Separating or Removing Whey from Curd in the Manufacture of Cheese; and I do hereby declare that the following is a full and exact description of the construction and operation thereof, reference being had to the accompanying sheet of drawings, making a part of this specification, and to the figures—Figure 1 being a view in perspective and Fig. 2 a vertical section—and letters of reference thereon—that is to say:

In the manufacture of cheese it has been the common practice hitherto to separate or remove the whey from the curd by a ladle or other dish or vessel moved in and by a person's hand, and it has been, and now is, well known that the process is very tedious, and that whey so separated or removed contains or carries in suspension portions or particles of curd or matter capable of being made into cheese.

By the mechanical means or apparatus which I have devised the whey can be separated or removed from the curd expeditiously, yet with such regularity and in such quantity that only the pure or comparatively pure whey will be abstracted.

I construct a pump of any ordinary or suitable kind, preferably of metal, and with metallic valves, and make the lower end of the suction-pipe with small apertures or openings therein, or, which I greatly prefer, I surround the lower end of an ordinary suction-pipe with or by a filter or sieve of wire-gauze, hair, or other fabric or finely-perforated material made to resemble a vessel several times the area or diameter of the suction-pipe. The said pump, with its perforated or open-work lower part, is provided with a support or stand, and when it is to be used the whole is placed in or among the coagulated milk, from which, by operating the pump, the whey is withdrawn, and such whey may be lifted or forced to any desired height.

On the drawings, *a* denotes the legs of the support or stand, which are strengthened by the platform *b*, tie-rods *c*, and operating-pieces *d*; *e*, the working-barrel of an ordinary lift-pump, with delivery-nozzle *f*, operating-handle *g*, and support *g'*, rod *h*, and valve *i*.

*j* is a screwed piece for connecting the working-barrel *e* and suction-pipe *k*, and between them the platform *b*. The said screwed piece *j* is formed with a seating for the bottom valve *l*. The lower end of the suction-pipe *k* is surrounded by the filter or sieve composed of bottom plate, *m*, rods or ribs *n*, filtering material *o*, and top ring, *p*. In the said top ring there are two or more openings, *q*, (three are shown by dotted lines in Fig. 1,) and attached to the disk *r*, which is screwed to the separating-pieces *d*, there are projecting pieces *s*. By passing openings *p* over projecting pieces *s* and turning the filter or sieve round a short way it is secured or locked somewhat in the manner of a bayonet, or a connection is made by what is commonly known as a "bayonet-joint."

It will be observed that the mechanical means or apparatus just described are so formed that they can be readily disconnected. The object of this is to allow the parts to be easily scalded or cleaned separately—a matter of great importance in the manufacture of cheese.

It will also be observed that the valves and other parts are made of metal, and that no flexible or elastic packing capable of absorbing moisture is employed.

By preference I make working-barrel *e* and suction-pipe *k* of copper, the rod *h*, support *g'*, and valves *i* and *l* of brass, the stand *a* and handle *g* of galvanized or tinned iron, and the filter or sieve of brass wire. It is obvious, however, that the different parts may be made of various materials.

In carrying my said invention into practical effect I prefer to adopt the following course: After the coagulated milk has been broken up in any usual way I gather or collect the curd to one side of the vessel containing it, then pass the apparatus above described, which I denominate the "whey-extractor," down among the whey at the opposite side of the said vessel, and at the same time commence to separate or remove the whey by operating the handle *g*.

Having now fully described my said invention and exactly set forth that modification of apparatus constructed in accordance therewith which I prefer, and which I have found to answer well, I would have it distinctly understood that I do not confine myself to the use of the particular construction of the apparatus shown on the drawings, nor to any particular kind or construction of lifting or forcing pump, nor to any particular form or construction of the filter or sieve, for it will be obvious that many kinds of pumps and many forms of filters or sieves could be employed. As an illustration, the filter or sieve could be made in length in the arc of a circle or in a straight length, and the ends be made to rest against the sides of the vessel and detached from the pump.

What I claim is—

In the manufacture of cheese, separating or removing whey from curd by mechanical means or apparatus consisting of a pump and filter or sieve, substantially as herein set forth, and illustrated by the accompanying sheet of drawings.

Signed and sealed by the within-named PHILIP COOMBES, at Liverpool aforesaid, this 5th day of December, A. D. 1865.

PHILIP COOMBES. [L. S.]

Witnesses:
    JOHN I. KING,
        *Patent Agent, Liverpool.*
    JOHN DAVIES,
        *His Clerk.*